US010298573B2

(12) United States Patent
Tamura

(10) Patent No.: US 10,298,573 B2
(45) Date of Patent: May 21, 2019

(54) MANAGEMENT SYSTEM, COMMUNICATION SYSTEM, DATA MANAGEMENT METHOD AND RECORDING MEDIUM

(71) Applicant: Hideki Tamura, Kanagawa (JP)

(72) Inventor: Hideki Tamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 240 days.

(21) Appl. No.: 15/186,961

(22) Filed: Jun. 20, 2016

(65) Prior Publication Data

US 2016/0381017 A1 Dec. 29, 2016

(30) Foreign Application Priority Data

Jun. 26, 2015 (JP) ................................. 2015-128397

(51) Int. Cl.
*H04L 29/06* (2006.01)
*G06F 21/31* (2013.01)
(Continued)

(52) U.S. Cl.
CPC .......... *H04L 63/0876* (2013.01); *G06F 21/31* (2013.01); *G06Q 10/101* (2013.01); *H04L 12/1831* (2013.01); *H04L 63/08* (2013.01); *H04L 63/10* (2013.01); *H04L 67/14* (2013.01); *H04L 63/083* (2013.01); *H04L 65/4015* (2013.01)

(58) Field of Classification Search
CPC ..... H04L 63/0876; H04L 63/08; H04L 63/10; H04L 63/083; H04L 63/4015; H04L 12/1831; H04L 67/14; H04L 65/4015; G06F 21/31; G06Q 10/101
See application file for complete search history.

(56) References Cited

U.S. PATENT DOCUMENTS 7,583,928 B2 * 9/2009 Iwatsu ................... H04H 20/82
455/3.01
7,584,431 B2 9/2009 Kazushige et al.
(Continued)

FOREIGN PATENT DOCUMENTS

JP 4241053 3/2009
JP 2014-093582 5/2014

*Primary Examiner* — Sarah Su
(74) *Attorney, Agent, or Firm* — Oblon, McClelland, Maier & Neustadt, L.L.P.

(57) ABSTRACT

A management system includes an authentication information management unit configured to manage authentication information used in authentication of a request to participate in a session among communication terminals; a content data management unit configured to manage content data transmitted among the communication terminals in the session; a request acceptance unit configured to accept a request for the content data managed by the content data management unit; an authentication unit configured to perform authentication using the authentication information managed by the authentication information management unit; and a transmission unit configured to transmit the content data managed by the content data management unit to a communication terminal that is a request source of the content data, when authentication of the request for the content data by the authentication unit using the authentication information is successful.

8 Claims, 19 Drawing Sheets

(51) Int. Cl.
*G06Q 10/10* (2012.01)
*H04L 12/18* (2006.01)
*H04L 29/08* (2006.01)

(56) References Cited

U.S. PATENT DOCUMENTS

| | | | |
|---|---|---|---|
| 2002/0049912 A1* | 4/2002 | Honjo | G06F 21/335 |
| | | | 726/10 |
| 2003/0033545 A1* | 2/2003 | Wenisch | G06F 21/31 |
| | | | 726/3 |
| 2004/0080771 A1* | 4/2004 | Mihira | H04N 1/32561 |
| | | | 358/1.13 |
| 2004/0128354 A1 | 7/2004 | Horikiri et al. | |
| 2006/0168651 A1* | 7/2006 | Araki | G06Q 10/107 |
| | | | 726/6 |
| 2006/0224783 A1* | 10/2006 | Sakoh | G06Q 30/02 |
| | | | 710/33 |
| 2007/0044146 A1* | 2/2007 | Murase | G06F 21/33 |
| | | | 726/10 |
| 2008/0065999 A1 | 3/2008 | Majors et al. | |
| 2009/0300741 A1* | 12/2009 | Greenwood | H04L 63/0838 |
| | | | 726/6 |
| 2009/0320107 A1* | 12/2009 | Corella | G06F 21/31 |
| | | | 726/6 |
| 2010/0235466 A1* | 9/2010 | Jung | H04N 1/00137 |
| | | | 709/217 |
| 2012/0324544 A1* | 12/2012 | Kanetomo | G06F 21/604 |
| | | | 726/4 |
| 2014/0165152 A1 | 6/2014 | Farouki | |
| 2014/0289530 A1* | 9/2014 | De Waal | H04L 63/08 |
| | | | 713/171 |
| 2015/0047002 A1* | 2/2015 | Tamura | H04L 63/08 |
| | | | 726/7 |
| 2015/0058949 A1* | 2/2015 | Collinge | H04L 63/08 |
| | | | 726/7 |
| 2015/0143119 A1* | 5/2015 | Matsunaga | H04L 63/061 |
| | | | 713/168 |
| 2015/0304361 A1 | 10/2015 | Tamura | |
| 2016/0094541 A1* | 3/2016 | Tan | G06F 21/6218 |
| | | | 713/156 |
| 2016/0212122 A1* | 7/2016 | Carroll | H04L 63/0823 |

\* cited by examiner

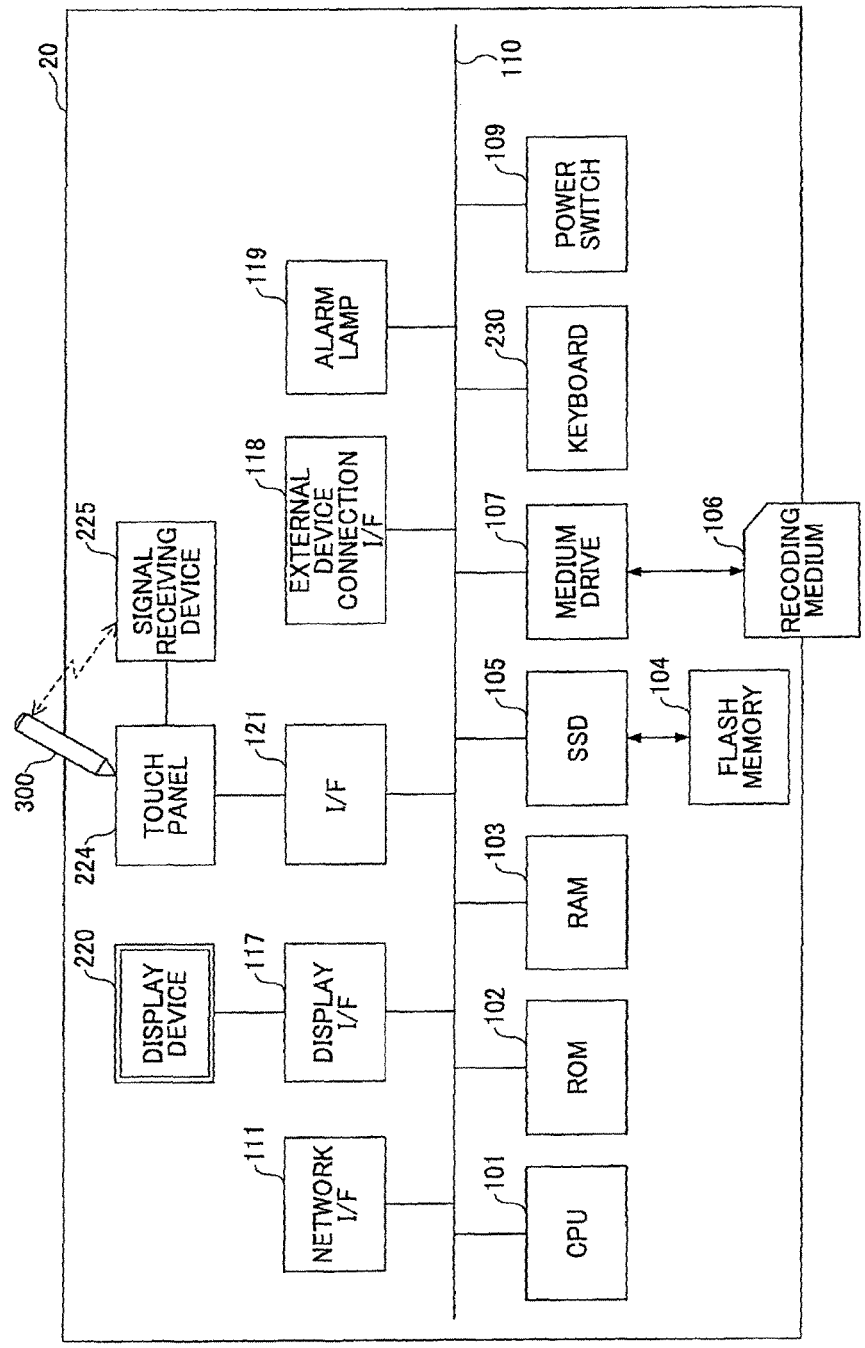

FIG.7A

| COMMUNICATION ID | PARTICIPATION AUTHENTICATION INFORMATION |
|---|---|
| 01a | 1234 |
| 01b | 1234 |
| 01c | 1234 |
| ... | ... |

FIG.7B

| SESSION ID = se01, PARTICIPATION AUTHENTICATION INFORMATION (PIN CODE) = 1234 ||||||||
|---|---|---|---|---|---|---|---|
| | SHEET No. = 1 |||| SHEET No. = 2 ||| |
| IMAGE NUMBER | IMAGE INFORMATION | COMMUNICATION ID | TIME | IMAGE INFORMATION | COMMUNICATION ID | TIME | |
| 1 | LINE (...) | 01a | 2014/9/1 13:20:30 | TEXT (...) | 01a | 2014/9/1 13:32:31 | ... |
| 2 | CIRCLE (...) | 01c | 2014/9/1 13:22:10 | TEXT (...) | 01c | 2014/9/1 13:42:17 | ... |
| 3 | DELETE (...) | 01a | 2014/9/1 13:26:11 | LINE (...) | 01b | 2014/9/1 13:43:44 | ... |
| ... | ... | ... | ... | ... | | | ... |
| N1 | TEXT (...) | 01a | 2014/9/1 13:33:13 | EOS | | | ... |
| ... | ... | | | | | | ... |
| N2 | EOS | | | | | | ... |

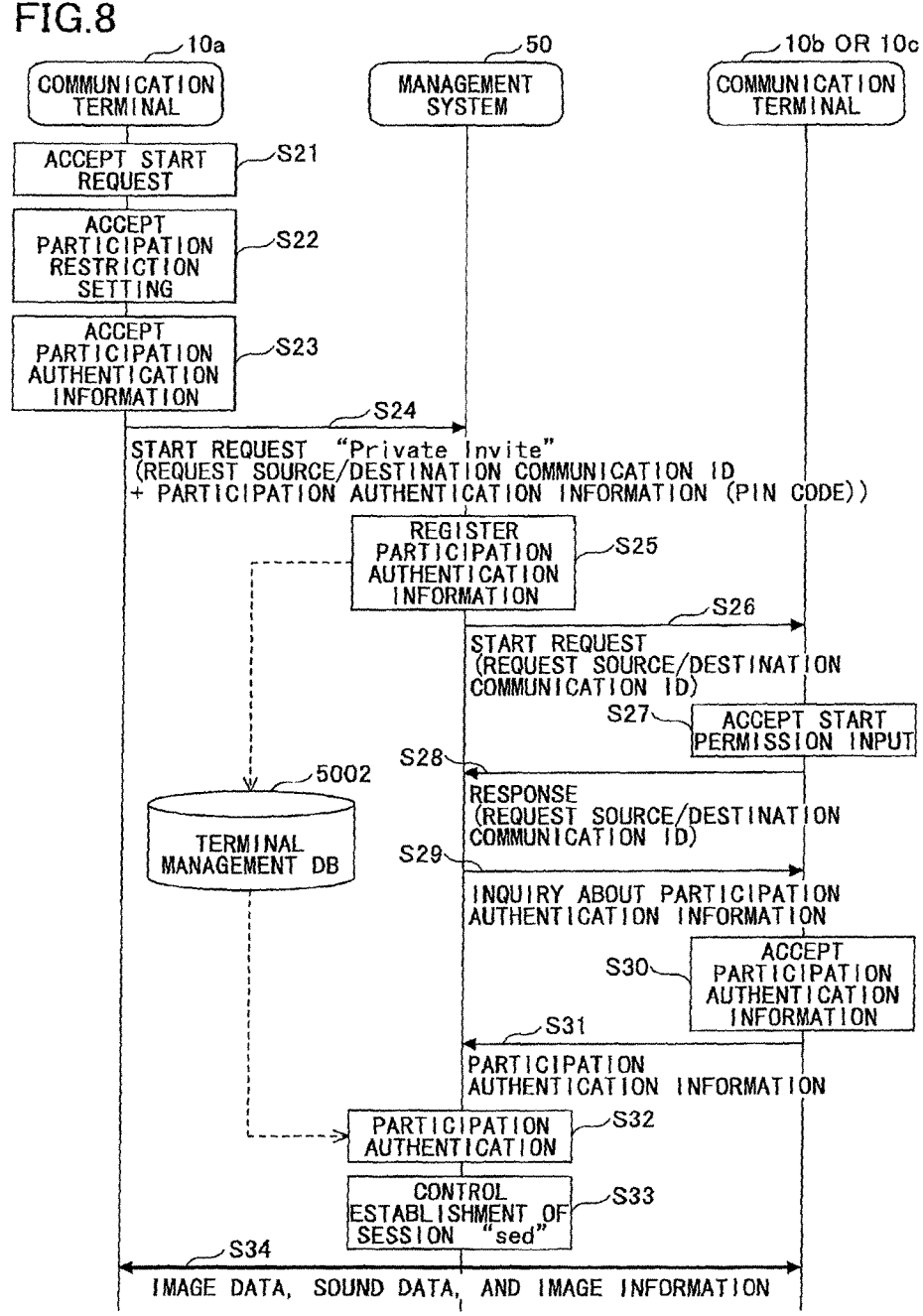

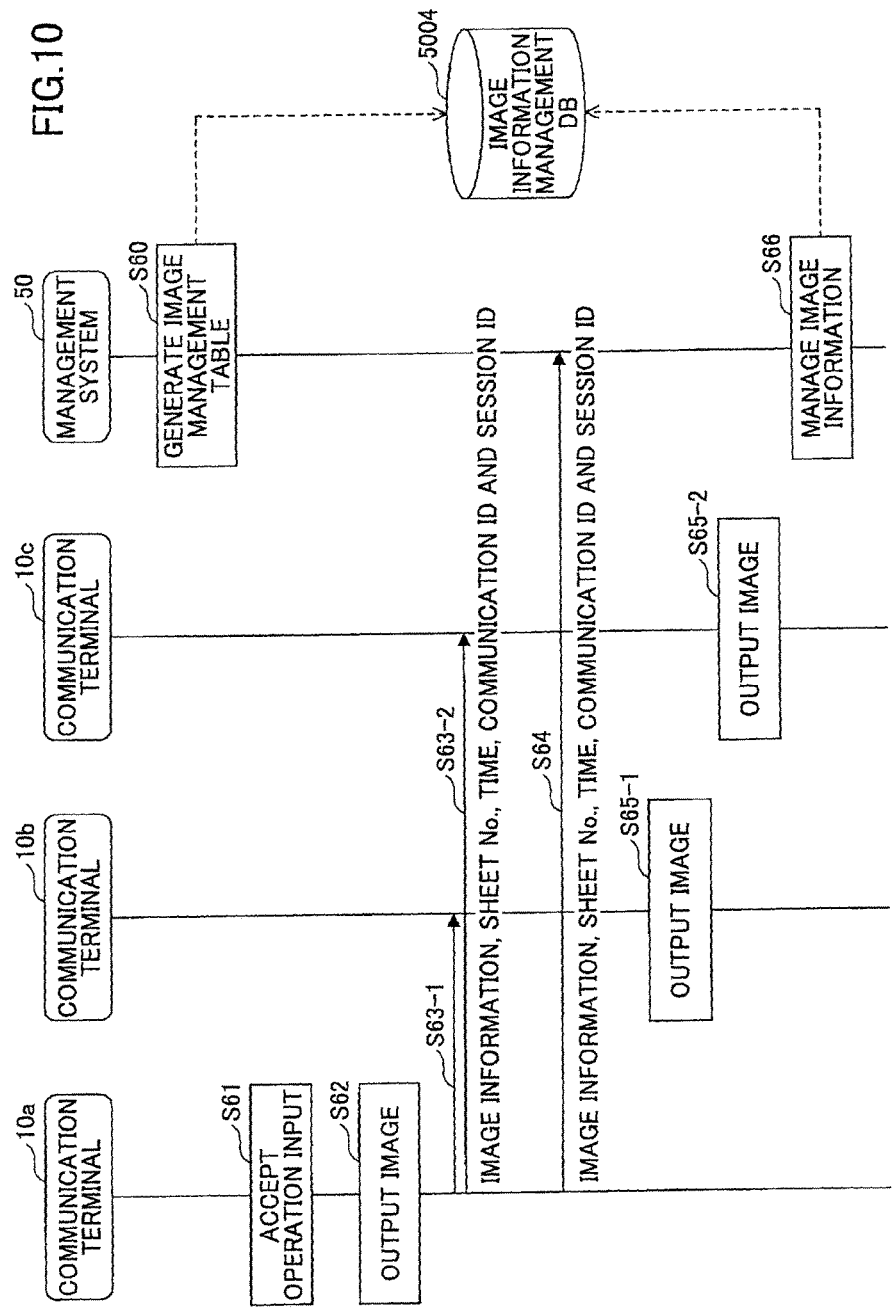

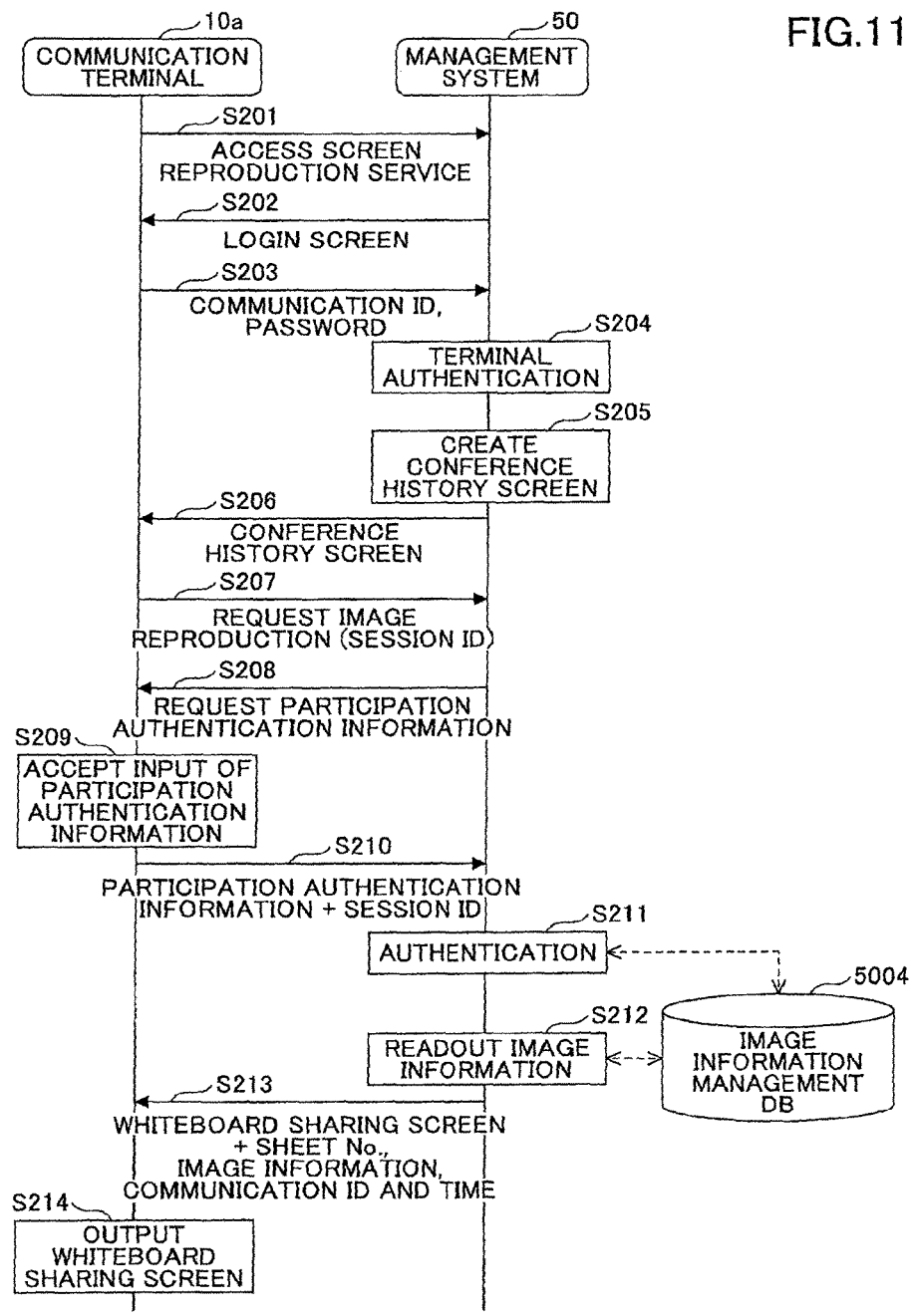

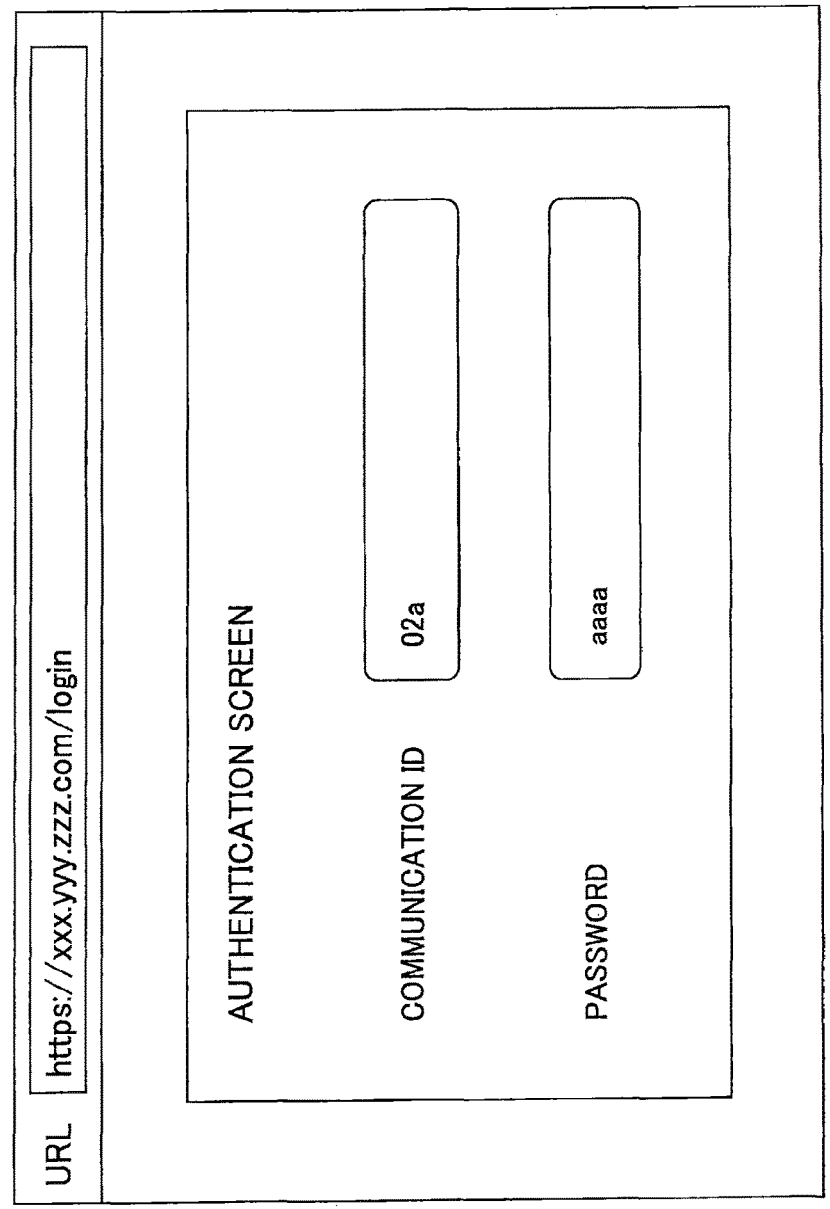

FIG.12B

URL | https://xxx.yyy.zzz.com/meetinglog

HISTORY OF CONFERENCES

| DATE AND TIME OF PARTICIPATION | HOURS OF PARTICIPATION | NUMBER OF LOCATIONS | DETAILED INFORMATION OF CONFERENCE | WHITEBOARD INFORMATION |
|---|---|---|---|---|
| 2014/9/1 9:44:50 | 00:32:33 | 3 | REFERENCE | REFERENCE |
| 2014/9/9 13:03:25 | 01:15:23 | 4 | REFERENCE | REFERENCE |
| ... | ... | ... | ... | ... |

FIG.12C

| URL | https://xxx.yyy.zzz.com/meetinglog |
|---|---|

HISTORY OF CONFERENCES

| DATE AND TIME OF PARTICIPATIO... | | WHITEBOARD INFORMATION |
|---|---|---|
| 2014/9/1 9:44:50 | ... | REFERENCE |
| 2014/9/9 13:03:25 | ... | REFERENCE |
| ... | ... | ... |

ACCESS IS RESTRICTED.

PARTICIPATION AUTHENTICATION INFORMATION (PIN CODE): 1234

[ OK ]  [ CANCEL ]

MANAGEMENT SYSTEM, COMMUNICATION SYSTEM, DATA MANAGEMENT METHOD AND RECORDING MEDIUM

CROSS-REFERENCE TO RELATED APPLICATIONS

The present application claims benefit of priority under 35 U.S.C. § 119 of Japanese Patent Application No. 2015-128397, filed Jun. 26, 2015. The contents of this application are incorporated herein by reference in their entirety.

BACKGROUND OF THE INVENTION

1. Field of the Invention

The disclosures herein generally relate to a management system, a communication system, a data management method and a computer readable recording medium storing a program for causing a computer to execute a process.

2. Description of the Related Art

Communication systems that perform a telephone call, a video conference or the like via a communication network such as the Internet or a dedicated line have become popular in recent years due to a demand for reducing travel costs and time of parties. In such a communication system when communication starts between communication terminals, content data such as image data or sound data are sent/received, thereby realizing communication between bases. Moreover, in order to perform the communication between bases smoothly, a method for sharing other content between bases in addition to content for a telephone call has been proposed.

For example, Japanese Patent No. 4241053 discloses a method for controlling a session so as to send/receive sounds to/from a terminal device of a communication partner, and furthermore for controlling a session so as to send/received images or handwritten data to/from the terminal device of the communication partner, thereby realizing voice sound with indicating images. Moreover, Japanese Patent No. 4241053 discloses a terminal device provided with a secondary storage device including a non-volatile memory such as a flash memory or a hard disk. The secondary storage device stores data such as handwritten data that is not desired to be lost even when the power is turned off.

On the other hand, Japanese Unexamined Patent Application Publication No. 2014-93582 discloses a method for comparing content of participation authentication information received from a participation request terminal with content of participation authentication information registered in a terminal management table in a management system, and if both contents coincide with each other, allowing participation of the participation request terminal in a session that is being established.

However, there is a problem that even if a restriction is put on participation in a session, when content data sent/received in the session are managed by a management unit, by accessing the management unit, the content of the session, participation of which is restricted, can be disclosed to an access source that does not participate in the session.

SUMMARY OF THE INVENTION

It is a general object of at least one embodiment of the present invention to provide a management system, a communication system, a data management method and a computer-readable recording medium storing a program for causing a computer to execute a process that substantially obviate one or more problems caused by the limitations and disadvantages of the related art.

In one embodiment, a management system includes an authentication information management unit configured to manage authentication information used in authentication of a request to participate in a session among communication terminals; a content data management unit configured to manage content data transmitted among the communication terminals in the session; a request acceptance unit configured to accept a request for the content data managed by the content data management unit; an authentication unit configured to perform authentication using the authentication information managed by the authentication information management unit; and a transmission unit configured to transmit the content data managed by the content data management unit to a communication terminal that is a request source of the content data, when authentication of the request for the content data by the authentication unit using the authentication information is successful.

In another embodiment, a communication system includes a management system; and a communication terminal. The communication system includes an authentication information management unit configured to manage authentication information used in authentication of a request to participate in a session among communication terminals; a content data management unit configured to manage content data transmitted among the communication terminals in the session; a request acceptance unit configured to accept a request for the content data managed by the content data management unit; an authentication unit configured to perform authentication using the authentication information managed by the authentication information management unit; and a transmission unit configured to transmit the content data managed by the content data management unit to a communication terminal that is a request source of the content data, when authentication of the request for the content data by the authentication unit using the authentication information is successful. The communication terminal is configured to transmit the content data to another communication terminal in the session.

In yet another embodiment, a data management method is performed for managing data in a management system that includes an authentication information management unit configured to manage authentication information used in authentication of a request to participate in a session among communication terminals, and a content data management unit configured to manage content data transmitted among the communication terminals in the session. The method includes accepting a request for the content data managed by the content data management unit; performing authentication using the authentication information managed by the authentication information management unit; and transmitting the content data managed by the content data management unit to a communication terminal that is a request source of the content data, when authentication of the request for the content data using the authentication information is successful.

In yet another embodiment, a non-transitory computer-readable recording medium stores a program, which when executed by processors, causes a management system that includes an authentication information management unit for managing authentication information used in authentication of a request to participate in a session among communication terminals, and a content data management unit for managing content data transmitted among the communication terminals in the session, to execute a data management method for managing data in the management system. The data management method includes accepting a request for the content data managed by the content data management unit; performing authentication using the authentication information managed by the authentication information management unit; and transmitting the content data managed by the content data management unit to a communication terminal that is a request source of the content data, when authentication of the request for the content data using the authentication information is successful.

In yet another embodiment, a non-transitory computer-readable recording medium stores a program, which when executed by processors, causes a communication terminal that can transmit content data to another communication terminal to execute a data management method for managing data in a management system. The data management method includes transmitting, from the communication terminal, authentication information that is set for each session to the management system, when the request to participate in the session among the communication terminals is performed or when the content data managed in the management system are requested.

Effect of the Invention

As described above, according to the embodiment, an effect is provided so that when content data sent/received in a session are managed by a management unit, it becomes possible to prevent the content data from being disclosed to an access source to the management unit that does not participate in the session.

BRIEF DESCRIPTION OF THE DRAWINGS

Other objects and further features of embodiments will become apparent from the following detailed description when read in conjunction with the accompanying drawings, in which:

FIGS. 4A and 4B are hardware configuration diagrams depicting an example of the communication terminal and the interactive whiteboard according to the embodiment;

FIGS. 7A and 7B are conceptual diagrams depicting examples of respective management tables managed in the management system according to the embodiment;

FIG. 8 is a sequence diagram depicting an example process until a session between communication terminals is established according to the embodiment;

FIG. 10 is a sequence diagram depicting an example process of sending image information between the communication terminals according to the embodiment;

FIG. 11 is a sequence diagram depicting an example process of reproducing an image according to the embodiment;

FIGS. 12A to 12C are diagrams depicting display examples of the display device according to the embodiment;

DESCRIPTION OF THE PREFERRED EMBODIMENTS

In the following, an embodiment of the present invention will be described with reference to the accompanying drawings.

<<General Arrangement of Communication System>>

Figure 1:
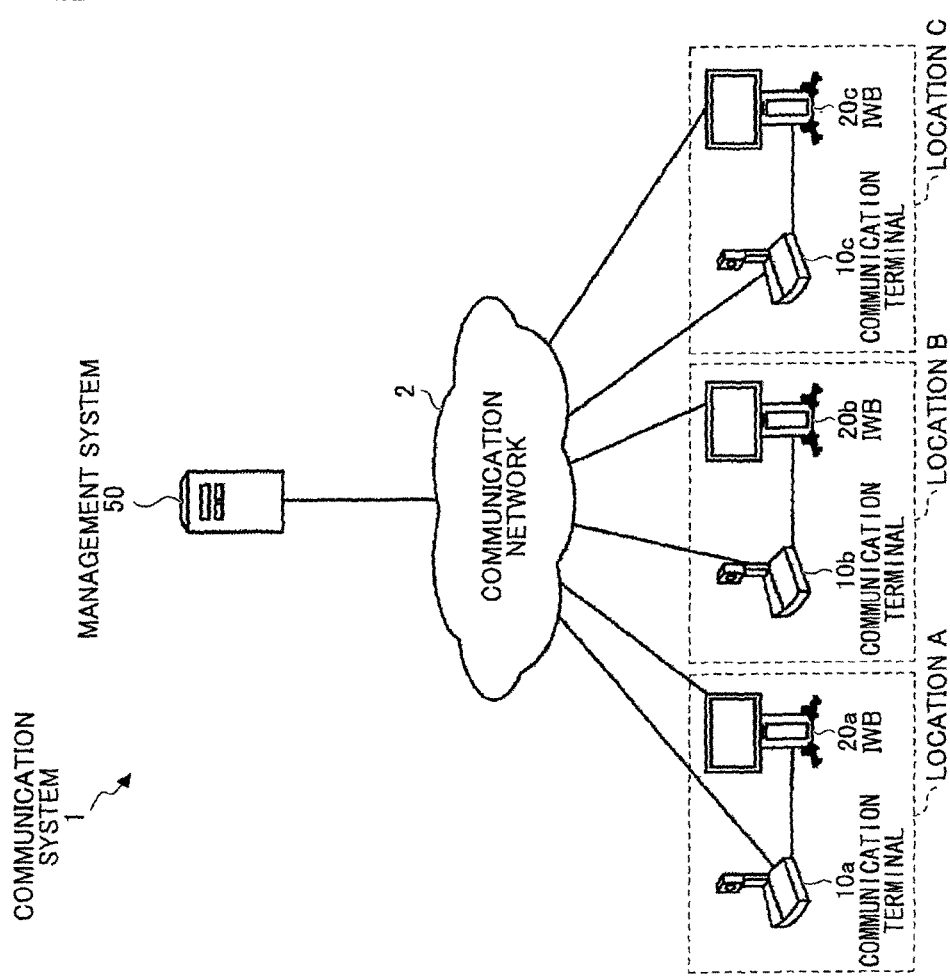
FIG. 1 is a schematic view depicting an example of a communication system according to an embodiment.

FIG. 1 is a schematic view depicting an example of a communication system according to the embodiment. As shown in FIG. 1, the communication system 1 includes communication terminals such as video conference terminals (10a, 10b, 10c), interactive whiteboards (in the following, denoted as "IWB") as an example of image sharing devices (20a, 20b, 20c) and a management system 50 for managing the respective communication terminals 10. In the following, when representing an arbitrary communication terminal of the communication terminals (10a, 10b, 10c), it is denoted as a communication terminal 10. Moreover, when representing an arbitrary IWB of the IWBs (20a, 20b, 20c), it is denoted as an IWB 20. The management system 50 is a computer provided with a server function.

By the communication system 1, speech communication can be performed between users of the communication terminals (10a, 10b, 10c). The speech communication can be realized by sound or sound and video (image). Moreover, an image in which a character, a figure, a symbol or the like is drawn can be shared among users of the IWBs (20a, 20b, 20c).

Moreover, the communication terminal 10, the IWB 20 and the management system 50 can perform communication by a communication network such as the Internet, a mobile telephone network or a LAN (Local Area Network). At each of locations (A, B, C), a communication terminal 10 and an IWB 20 are arranged, and a video conference can be performed between the locations by using both the communication terminal 10 and the IWB 20. In FIG. 1, in order to make explanation simple, at each of the locations (A, B, C), one communication terminal 10 and one IWB 20 are shown. But, plural terminals or plural IWBs may be arranged. Moreover, at each of the locations (A, B, C), for example, a communication terminal other than the communication terminal 10 and the IWB 20, such as a projector or a digital signage device may be arranged for a communications connection via the communication network 2.

<<Hardware Configuration of the Communication System>>

Figure 2:
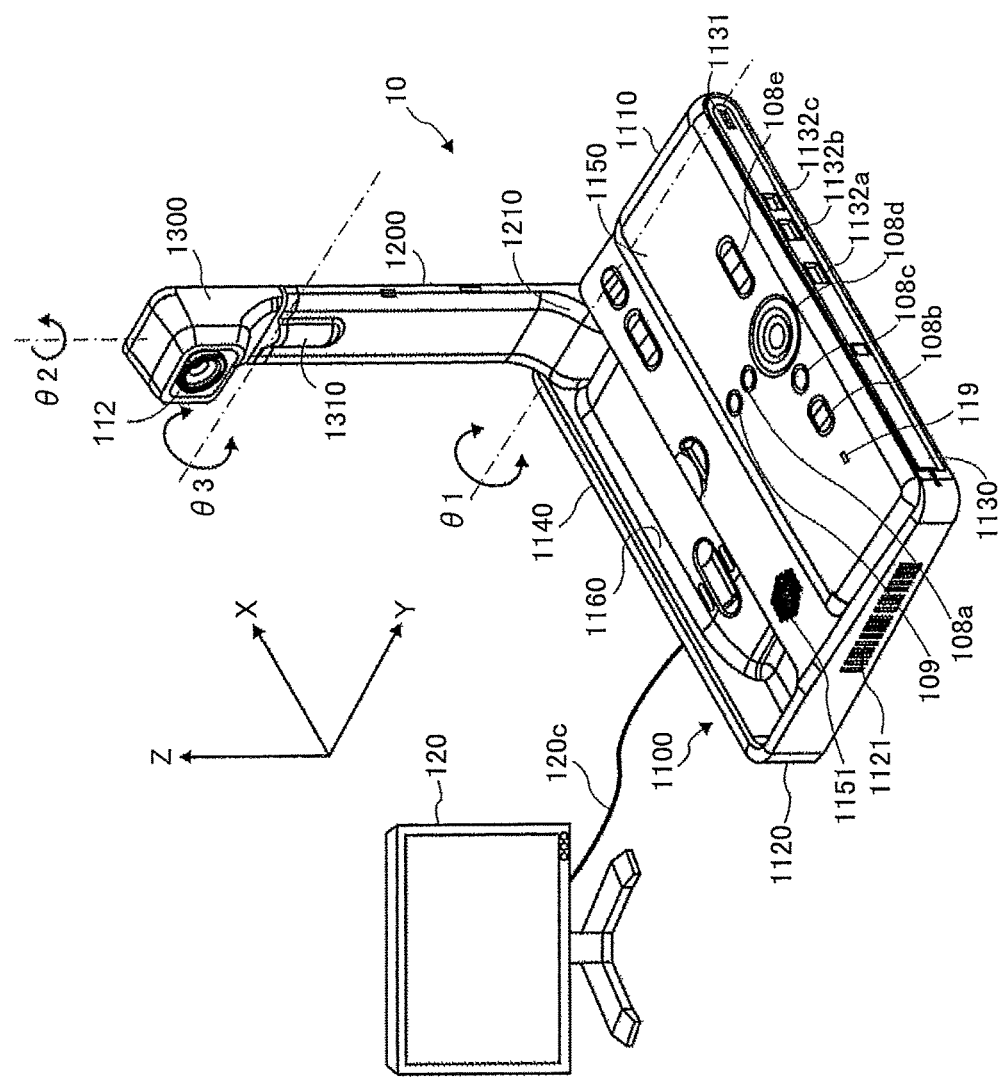
FIG. 2 is an external view depicting an example of a communication terminal according to the embodiment.

Next, a hardware configuration of the communication system will be described. FIG. 2 is an external view of a communication terminal 10 according to the embodiment. As illustrated in FIG. 2, the communication terminal 10 includes a casing 1100, an arm 1200 and a camera housing 1300. Among these portions, a front wall 1110 of the casing 1100 has an inlet face including a plurality of inlet holes, and a back wall 1120 of the casing 1100 has an exhaust face 1121 on which a plurality of exhaust holes are formed. Accordingly, by driving a cooling fan included in the casing 1100, air behind the communication terminal 10 can be taken in via the inlet face and exhausted to the rear of the communication terminal 10 via the exhaust face 1121. A right-side wall 1130 of the casing 1100 has a sound pickup hole 1131, and a built-in microphone 114, described later, is capable of picking up voice, sound, noise or the like.

An operation panel 1150 is formed toward the right-side wall 1130 of the casing 1100. The operation panel 1150 has a plurality of operation buttons (108a to 108e) described later, a power switch 109 described later, and an alarm lamp 119 described later. The operation panel 1150 also has a sound output face 1151, which is formed of a plurality of sound output holes for allowing output sound from a built-in speaker 115, described later, to pass through. In addition, an accommodation portion 1160 serving as a recess for accommodating the arm 1200 and the camera housing 1300 is formed toward a left-side wall 1140 of the casing 1100. A plurality of connection ports (1132a to 1132c) for electrically connecting cables to an external device connection interface (I/F) 118 described later are provided on the right-side wall 1130 of the casing 1100. In contrast, a connection port for electrically connecting a cable 120c for a display device 120 to the external device connection I/F 118 described later is provided toward the left-side wall 1140 of the casing 1100.

The following description uses the term "operation button 108" for indicating an arbitrary one of the operation buttons (108a to 108e), and the term "connection port 1132" for indicating an arbitrary one of the connection ports (1132a to 1132c).

Next, the arm 1200 is attached to the casing 1100 via a torque hinge 1210 and is configured to be rotatable in the vertical direction within a range of a tilt angle θ1 of 135 degrees with respect to the casing 1100. FIG. 2 indicates a state in which the tilt angle θ1 is 90 degrees. The camera housing 1300 has a built-in camera 112, which will be described later, and the camera 112 can capture an image of a user, a document, a room, or the like. In addition, the camera housing 1300 has a torque hinge 1310. The camera housing 1300 is attached to the arm 1200 via the torque hinge 1310 and is configured to be rotatable in the vertical and horizontal directions within a range of a pan angle θ2 of ±180 degrees and a tilt angle θ3 of ±45 degrees with respect to the arm 1200, where the state illustrated in FIG. 3 is 0 degrees.

The external view illustrated in FIG. 2 is only exemplary and the appearance is not restricted. The communication terminal 10 may be, for example, a generic PC, a smart phone, a tablet terminal or the like. The camera 112 and the microphone 114 need not necessarily be built-in devices and may be external devices.

Figure 3:
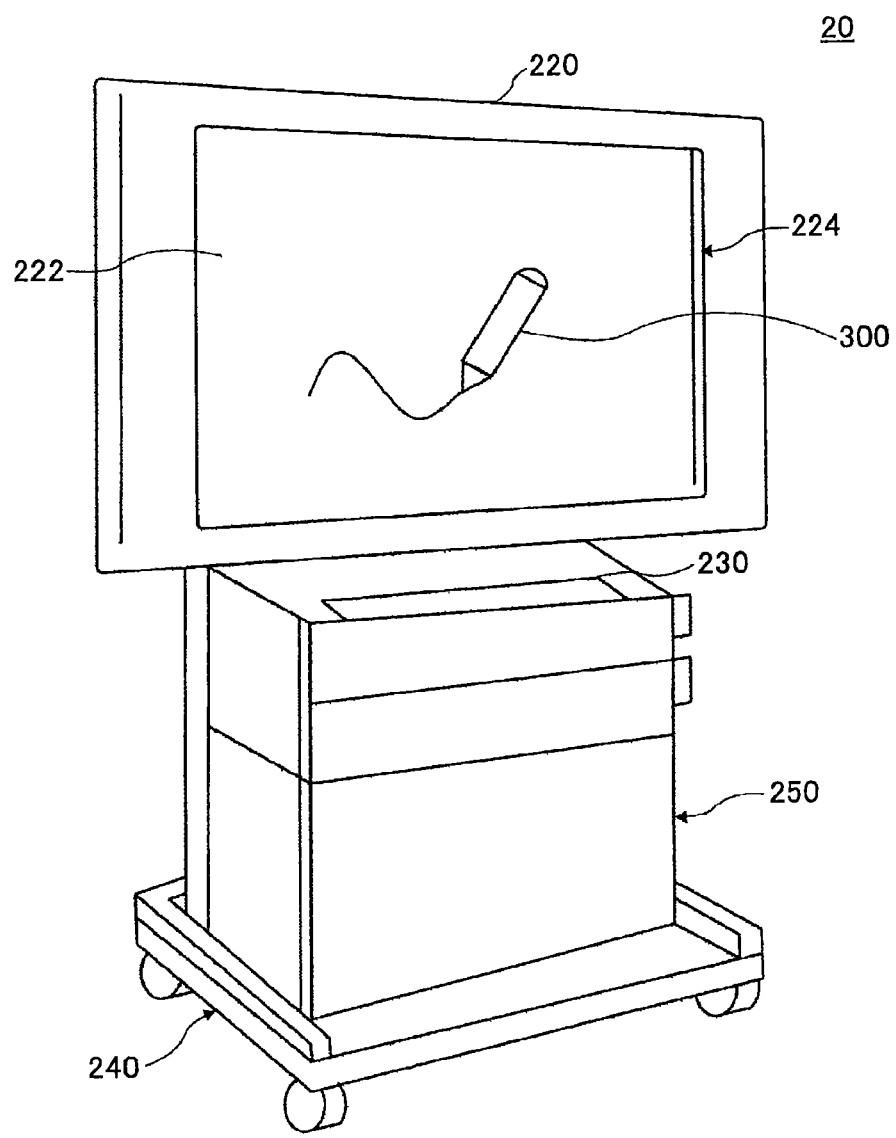
FIG. 3 is an external view depicting an example of an interactive whiteboard according to the embodiment.

FIG. 3 is an external view of the IWB 20 according to the embodiment. As illustrated in FIG. 3, the IWB 20 includes a display device 220, a stand 240 and a device storage part 250. The display device 220 includes a flat panel such as a liquid crystal display (LCD) or a plasma display panel (PDP), and a display surface 222 for displaying an image and a touch panel 224 are arranged in front of a casing of the display device 220.

In an input device 300, a signal transmission device is arranged. When bringing a nib of the input device 300 into contact with the display surface 222, the signal transmission device sends a writing detection signal (contact detection signal) as a wireless signal. At a timing that the writing detection signal sent by the input device 300 is received on the side of the IWB 20, the display device 220 displays a character, a figure or the like written at a coordinate position detected by the touch panel 224. Moreover, when bringing another end of the input device 300 into contact with the display surface 222, the signal transmission device sends an erasing detection signal (contact detection signal) as a wireless signal. At a timing that the erasing detection signal sent by the input device 300 is received on the side of the IWB 20, the display device 220 erases a character, a figure or the like written at a coordinate position detected by the touch panel 224 from the display surface. The device storage part 250 stores, for example, various devices such as a main body of the IWB 20. Moreover, on an upper face of the device storage part 250 is installed a keyboard 230 with which an input operation is performed.

The management system 50 has the same external appearance as that of a generic server computer, and a description of the external appearance will be omitted.

Figure 4A:
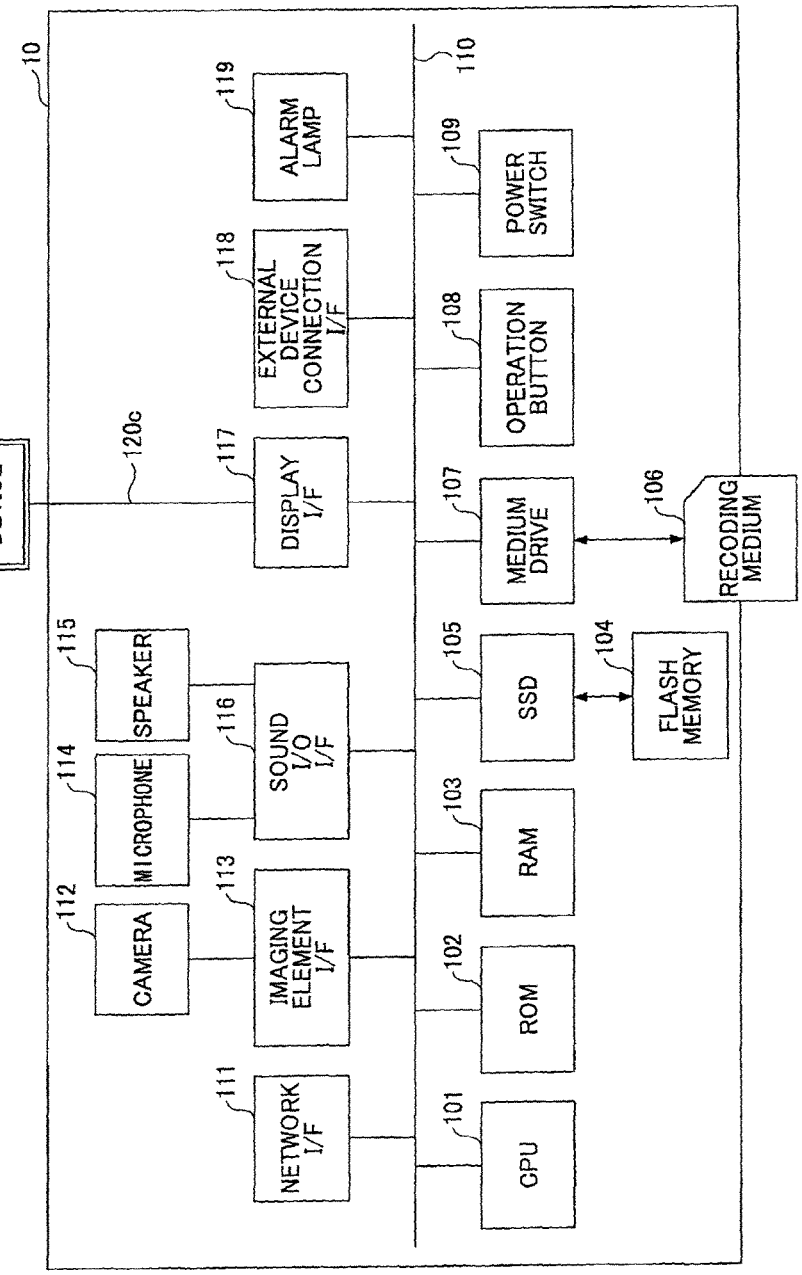

FIG. 4A is a hardware configuration diagram of a communication terminal 10 according to the embodiment. As illustrated in FIG. 4A, the communication terminal 10 includes a central processing unit (CPU) 101 that controls an overall operation of the communication terminal 10, a read-only memory (ROM) 102 that stores a program used for driving the CPU 101, such as an initial program loader (IPL), a random-access memory (RAM) 103 used as a work area for the CPU 101, a flash memory 104 that stores various types of data, such as programs for various types of terminals, image data and sound data, a solid state drive (SSD) 105 that controls reading/writing of various types of data from/to the flash memory 104 under control of the CPU 101, a medium drive 107 that controls reading/writing (storage) of data from/to a recording medium 106 such as a flash memory, the operation button 108 operated when selecting a destination, the power switch 109 for turning ON/OFF the power of the communication terminal 10, and a network interface (I/F) 111 for performing data communication using the communication network 2.

In addition, the communication terminal 10 includes the built-in camera 112, which captures an image of a subject and obtains image data under control of the CPU 101; an imaging element I/F 113 that controls driving of the camera 112; the built-in microphone 114, which receives a sound input; the built-in speaker 115, which outputs sound; a sound input/output I/F 116 that processes inputting/outputting of a sound signal between the microphone 114 and the speaker 115 under control of the CPU 101; a display I/F 117 that communicates image data to an external display device 120 under control of the CPU 101; the external device connection I/F 118 for connecting various external devices; the alarm lamp 119, which indicates an abnormality of various functions of the communication terminal 10; and a bus line 110 such as an address bus or a data bus for electrically connecting the above-described elements as illustrated in FIG. 4A.

The display device 120 includes a liquid crystal display device (LCD), an organic electroluminescence (EL) display device, or the like, and displays an image of a subject, an icon for operation, or the like. In addition, the display device 120 is coupled to the display I/F 117 by the cable 120c. The cable 120c may be an analog red green blue (RGB) (video graphic array (VGA)) signal cable, a component video cable, a high-definition multimedia interface (HDMI™) signal cable, or a digital video interactive (DVI) signal cable.

The camera 112 includes a lens and a solid-state imaging element that converts light into electric charges to digitize an image (video) of a subject. As the solid-state imaging element, for example, a complementary metal-oxide-semiconductor 25, (CMOS) or a charge-coupled device (CCD) is used.

The external device connection I/F 118 is capable of connecting external devices such as an external camera, an external microphone and an external speaker, respectively, by using a Universal Serial Bus (USB) cable or the like, which is inserted into the connection port 1132 of the casing 1100. When an external camera is connected, the external camera is driven in preference to the built-in camera 112 under control of the CPU 101. Similarly, when an external microphone is connected or an external speaker is connected, the external microphone or the external speaker is driven in preference to the built-in microphone 114 or the built-in speaker 115 under control of the CPU 101.

The recording medium 106 is configured to be removable from the communication terminal 10. In addition, a nonvolatile memory that reads or writes data under control of the CPU 101 is not limited to the flash memory 104, and an electrically erasable and programmable read-only memory (EEPROM) may be used.

The display device 120 may be built-in in the main body of the communication terminal 10. Moreover, in each of the various types of communication terminals, a hardware configuration depending on its function, which is not shown in FIGS. 4A and 4B, may be arranged. Furthermore, a part of the hardware configuration shown in FIGS. 4A and 4B may not be arranged.

Subsequently, by using FIG. 4B, difference between a hardware configurations of the IWB 20 and of the communication terminal 10 will be explained. FIG. 4B is the hardware configuration diagram illustrating the IWB 20 according to the embodiment. Different from the communication terminal 10, the IWB 20 according to the embodiment does not include a camera 112, an imaging element I/F 113, a microphone 114, a speaker 115 or a sound input/output I/F 116.

On the other hand, the IWB 20 is provided with the touch panel 224, an I/F 121 for the touch panel 224 and a signal reception device 225 for receiving a contact detection signal sent from the input device 300 and outputting the contact detection signal to the touch panel 224. A touch panel driver, which is a control circuit for the touch panel 224, recognizes that an input operation is performed based on the contact detection signal sent from the input device 300, and outputs image information corresponding to the input operation by the input 25, device 300. The built-in display device 220 in the IWB 20 outputs respective images superposed based on image information output by the touch panel driver at a timing of an input operation or image information sent from another IWB 20 via the communication network 2. Moreover, the IWB 20 is provided with the keyboard 230. Based on an operation for the keyboard 230, an operation input can be received.

Figure 5:
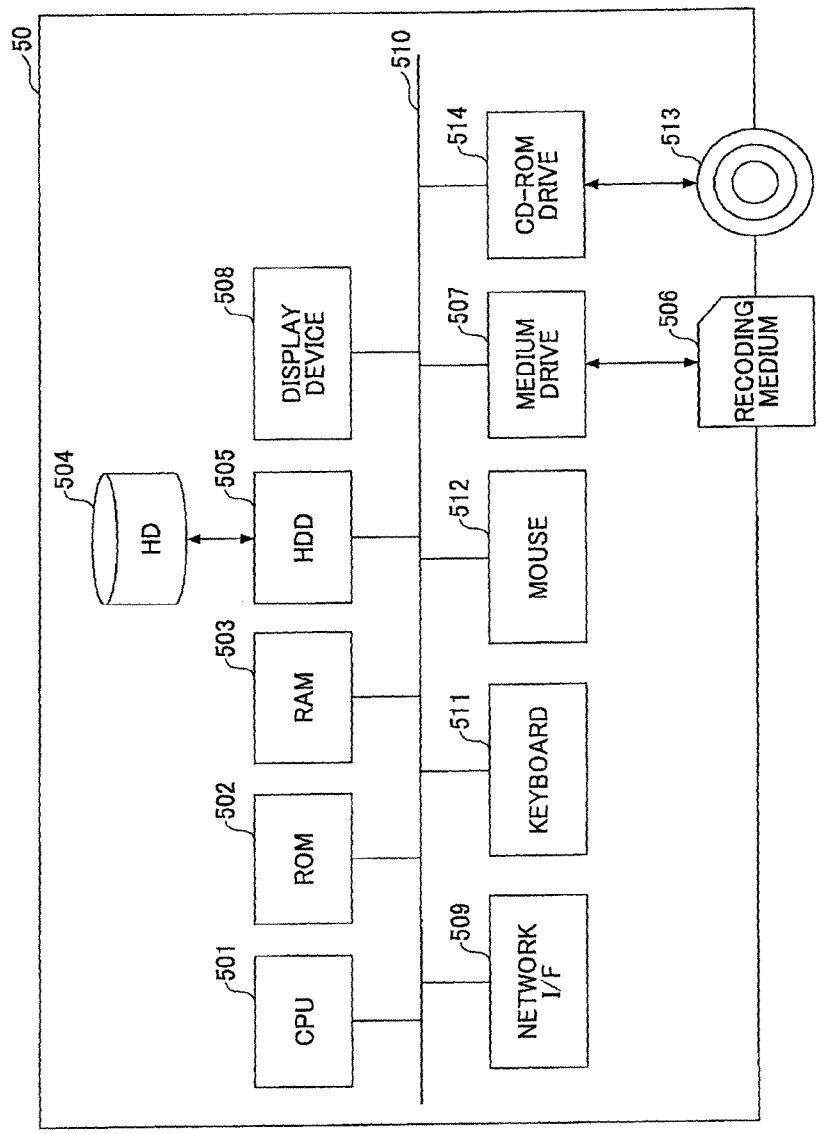
FIG. 5 is a hardware configuration diagram depicting an example of a management system according to the embodiment.

FIG. 5 is a hardware configuration diagram of the management system 50 according to the embodiment. The management system 50 includes a CPU 501 that controls the overall operation of the management system 50; a ROM 502 that stores a program used for driving the CPU 501, such as an IPL; a RAM 503 used as a work area for the CPU 501; an HD 504 that stores various types of data, such as a program for the management system 50; a hard disk drive (HDD) 505 that controls reading/writing of various types of data from/to the HD 504 under control of the CPU 501; a medium drive 507 that controls reading/writing (storage) of data from/to a recording medium 506 such as a flash memory; a display device 508 that displays various types of information such as a cursor, a menu, a window, characters or an image; a network I/F 509 for communicating data using the communication network 2; a keyboard 511 including a plurality of keys for entering characters, numerals, various instructions or the like; a mouse 512 that performs selection and execution of various instructions, selection of a processing target, movement of a cursor or the like; a compact disc read-only memory (CD-ROM) drive 514 that controls reading/writing of various types of data from/to a CD-ROM 513 serving as an example of a removable recording medium; and a bus line 510 such as an address bus and a data bus for electrically connecting the above-described elements as illustrated in FIG. 5.

<<Functional Configuration of the Communication System>>

Figure 6:
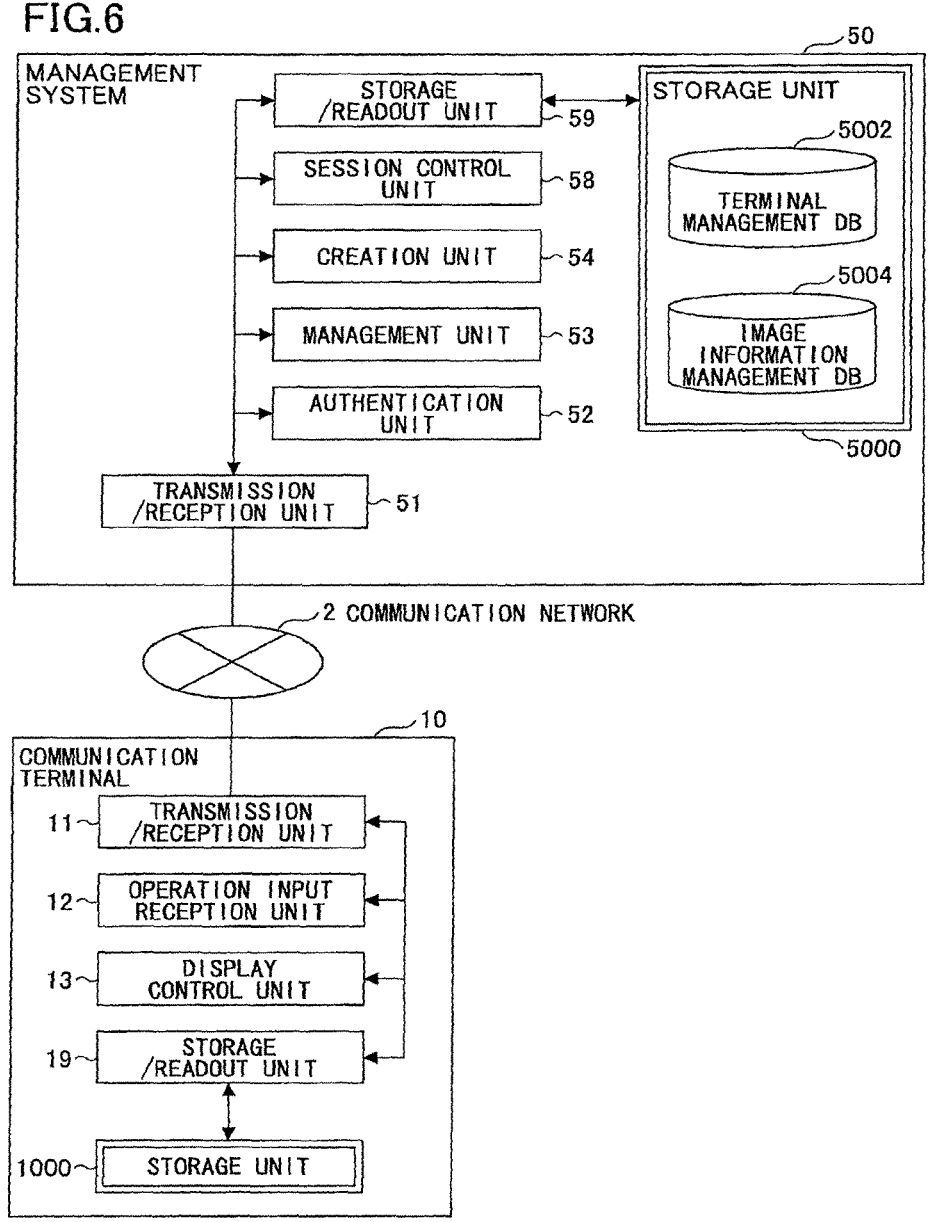
FIG. 6 is a functional block diagram depicting an example of the communication terminal and the management system according to the embodiment.

Next, the functional configuration of the communication system will be described. FIG. 6 is a functional block diagram of the communication terminal 10 and the management system 50 of the communication system 1 according to the embodiment. In FIG. 6, the terminal 10 and the management system 50 are connected to be capable of communicating data via the communication network 2.

<Functional Configuration of Communication Terminal>

The communication terminal 10 includes a 25, transmission/reception unit 11, an operation input acceptance unit 12, a display control unit 13 and a storage/readout unit 19. These elements are functions that are realized by operating any of the elements illustrated in FIG. 4A in response to a command from the CPU 101 in accordance with a program loaded from the flash memory 104 onto the RAM 103. Moreover, the communication terminal 10 or the IWB 20 has a storage unit 1000 configured with the ROM 102, the RAM 103 and the flash memory 104.

(Functional Configuration of Communication Terminal)

Next, using FIG. 6, the functional configuration of the communication terminal 10 will be described in detail. In the following description of the functional configuration of the communication terminal 10, among the elements illustrated in FIG. 4A, relationships with main elements for realizing the functional configuration of the communication terminal 10 will also be described.

The transmission/reception unit 11 of the communication terminal 10 is enabled by commands from the CPU 101 and via the network I/F 111, and performs transmission/reception of various types of data (or information) to/from the communication terminal of the other side, each apparatus, a system or the like via the communication network 2.

The operation input acceptance unit 12 is enabled by a command from the CPU 101, the operation button (108a, 108b, 108c, 108d, 108e) and the power switch 109, and receives various inputs or various types of selections by the user.

The display control unit 13 is enabled by a command from the CPU 101 and the display I/F 117, and controls transmission of image data sent from a communication terminal of the other side to the display device 120. The display control unit 13 controls transmission of image information sent from the communication terminal of the other side or image information based on an operation of the input device 300 of the own terminal to be sent to the display device 220.

The storage/readout unit 19 is enabled by a command from the CPU 101, and stores various types of data into the storage unit 1000 and extracts various types of data from the storage unit 1000.

<Functional Configuration of Management System>

The management system 50 includes a transmission/reception unit 51, an authentication unit 52, a management unit 53, a creation unit 54, a session control unit 58 and a storage/readout unit 59. These elements are functions that are enabled by operating any of the elements illustrated in FIG. 5 in response to a command from the CPU 501 in accordance with a program for the management system 50 loaded from the HD 504 onto the RAM 503. In addition, the management system 50 includes a storage unit 5000 configured with the HD 504. The storage unit 5000 includes respective DBs configured with respective tables, which will be described later.

(Terminal Management Table)

FIG. 7A is a conceptual diagram illustrating the terminal management table. In the terminal management table, participation authentication information used for authenticating a participation request from another communication terminal 10 in a session that the communication terminal 10 participates in is managed in association with a communication ID of the communication terminal 10. The communication ID is information for identifying a communication destination in the communication system 1. The communication ID is not particularly limited as long as it is information that can identify a communication destination, but includes, for example, identification information of the communication terminal 10, an account of a user of the communication terminal 10, or the like. The explanation continues assuming that communication IDs of the communication terminals (10a, 10b, 10c) are "01a, 01b, 01c", respectively.

(Image Information Management Table)

FIG. 7B is a conceptual diagram illustrating the image information management table. The image information management table is created for each session ID of a session between communication terminals 10. In the image information management table, for each of divided sections having sheet numbers, numbers of images, image information, a communication ID of a communication terminal 10 which is a transmission source of the image information, and a time when the image information is created are managed in association with each other. The image information includes stroke data indicating a stroke such as a "line" or a "circle", text data indicating a text, data "delete" indicating an image to be deleted or the like. These pieces of image information may include coordinate information indicating a position where an image is output or deleted, information indicating a size, color or a font of an image or the like. Moreover, the image information may include not only the above-described image information of the image to be added or the image information of the image to be deleted, but also image information of an image to be corrected. In the embodiment, text is an example of an image, and includes a character, a symbol and the like. The above-described pieces of image information are stored in a field of image information in the image information management table in an order of image numbers until the service ends (EOS: End of Service). Moreover, according to the embodiment, the IWB 20 can output different images on respective work spaces which can be switched by a tab displayed on the display device 220. The above-described sheet numbers are numbers for identifying the work spaces. The "sheet" may be replaced by an arbitrary term indicating a region where an image is drawn, such as a worksheet, a space or a workspace. Furthermore, in the respective image information management tables, a session ID of a session between communication terminals 10, and participation authentication information used for authenticating a participation request in this session are managed.

(Functional Configuration of Management System)

Next, the functional configuration of the management system 50 will be described in detail. Note that, in the following description of the functional configuration of the management system 50, among elements illustrated in FIG. 5, relationships with main elements for realizing the functional configuration of the management system 50 will also be described.

The transmission/reception unit 51 is executed by a command from the CPU 501 and by the network I/F 509, and performs transmission/reception of various data (or information) to/from the respective apparatuses or a system via the communication network 2.

The authentication unit 52 is operated by a command from the CPU 501, and performs authentication of a participation request in a session or authentication of a request for content data.

The management unit 53 is operated by a command from the CPU 501. The management unit 53 manages participation authentication information in the terminal management table (see FIG. 7B).

The creation unit 54 is operated by a command from the CPU 501, and creates a document displayable on a browser. The document may be, for example, described in the HyperText Markup Language (HTML).

The session control unit 58 is operated by a command from the CPU 501, and performs a control for a session of sending content data between communication terminals. Here a session between communication terminals 10 will be denoted as a session "sed". Moreover, the above-described control includes a control for establishing a session, a control for causing a communication terminal 10 to participate the session, a control for disconnecting the session or the like.

The storage/readout unit 59 is operated by a command from the CPU 501 and the HDD 505, or operated by a command from the CPU 501. The storage/readout unit 59 performs processing to store various data in the storage unit 5000 or extract various data stored in the storage unit 5000.

<<Process or Operation of Communication System>>

Next, a process or an operation of the communication terminal 10 and the management system 50 of the communication system 1 according to the embodiment will be described. The communication 25, terminals (10a, 10b, 10c) are connected to the IWB (20a, 20b, 20c), respectively, via the external device connection I/F 118. Therefore, among the communication terminals (10a, 10b, 10c), in addition to image data and sound data for video conference, image information on shared images such as stroke information can be shared. At first, with reference to FIG. 8, a process of establishing a session among the communication terminals 10 will be described. FIG. 8 is a sequence diagram depicting a process of establishing a session among the communication terminals.

Figure 9A:
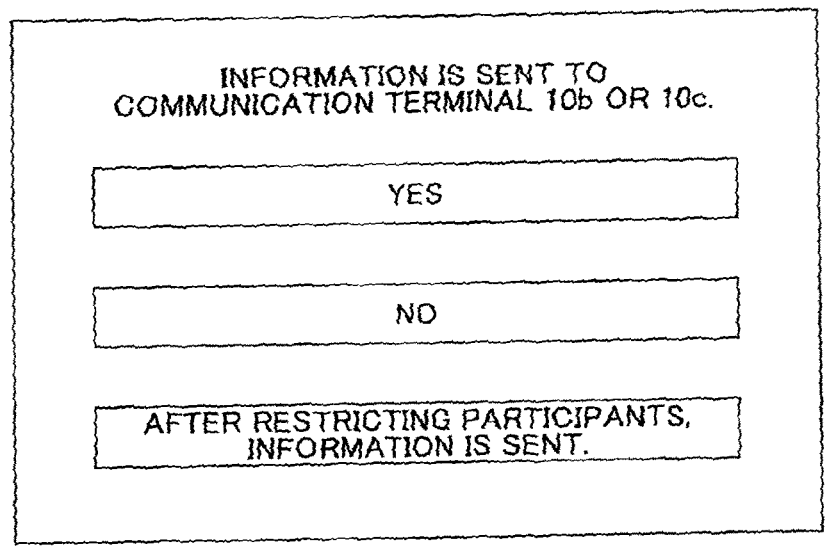
FIGS. 9A to 9C are diagrams depicting display examples of a display device according to the embodiment.

The operation input acceptance unit 12 of the communication terminal 10a accepts a request of starting communication to the communication terminals (10b, 10c) in response to an operation of the operation button 108 by a user (step S21). Subsequently, the display control unit 13 of the communication terminal 10a outputs a setting screen for restricting participation on the display device 120. FIG. 9A is a diagram depicting a display example of the setting screen for restricting participation. The operation input acceptance unit 12 of the communication terminal 10a accepts the setting for restricting participation in response to 25, the operation by the user on the setting screen (step S22). In the following, the explanation continues assuming that the restriction of participation is set.

Figure 9B:
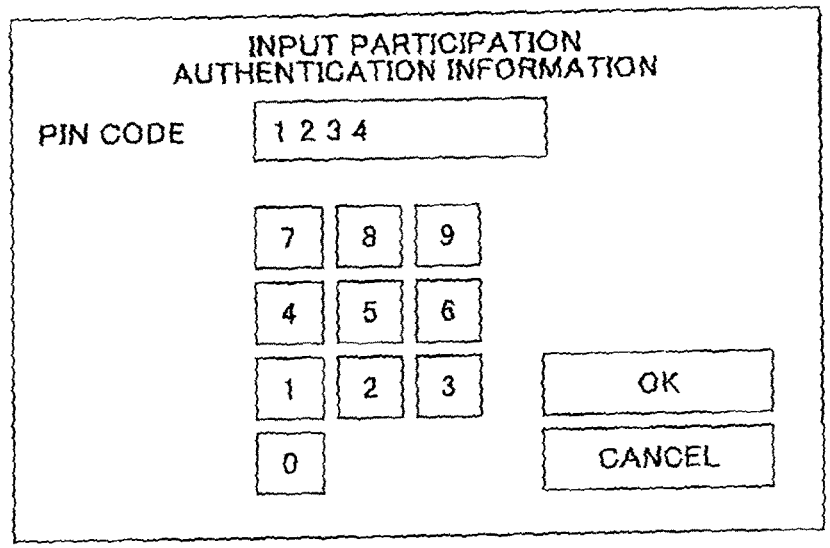

The display control unit 13 of the communication terminal 10a outputs a screen for accepting participation authentication information on the display device 120. FIG. 9B is a diagram depicting a display example of the screen for accepting participation authentication information. The operation input acceptance unit 12 of the communication terminal 10a accepts an input of PIN code as the participation authentication information in response to the operation by the user on the acceptance screen (step S23).

The transmission/reception unit 11 of the communication terminal 10a sends a start request for communication "Private Invite" by a session, in which participation restriction is set, to the management system 50 (step S24). This start request for communication includes a communication ID of the communication terminal 10a that is a request source for starting communication, communication IDs of the communication terminals (10b, 10c) of the destination, and the participation authentication information, an input of which is accepted in step S23, i.e. PIN codes.

When the transmission/reception unit 51 of the management system 50 receives the start request, the management unit 53 registers the participation authentication information included in the start request into a field of participation authentication information of a record, in which the communication ID of the communication terminal 10a of the start request source is recorded (step S25).

Next, the transmission/reception unit 51 of the management system 50 sends the start request for communication "Private Invite" by the session, in which participation restriction is set, to the destination communication terminals (10b, 10c) (step S26). This start request for communication includes the communication ID of the communication terminal 10a that is the request source for starting communication, and the communication ID of the communication terminal (10b or 10c) of the destination.

Figure 9C:
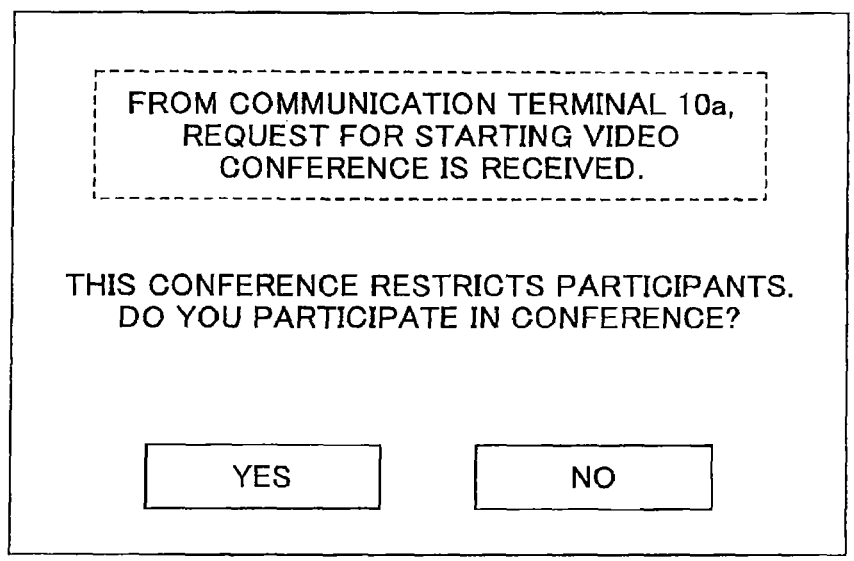

In each of the communication terminals (10b, 10c) of the destination, when the start request for communication is received, the display control unit 13 outputs a start request reception screen on the display device 120 indicating that the start request information is received. FIG. 9C is a diagram depicting a display example of the start request reception screen. The respective operation input acceptance units 12 of the communication terminals (10b, 10c) accept inputs of permission for starting in response to operations by the user on start request reception screen (step S27).

Subsequently, the transmission/reception unit of each of the communication terminals (10b, 10c) sends a response indicating that participation in a session, in which the participation restriction is set, is required to the management system 50 (step S28). This response includes the communication ID of the communication terminal 10a that is a request source for starting communication, and the communication ID of the destination communication terminal (10b or 10c).

The transmission reception unit of the management system 50, when receiving the response, queries each of the communication terminals (10b, 10c) about participation authentication information (step S29). Accordingly, the display control unit 13 of each of the communication terminals (10b, 10c) outputs an acceptance screen for participation authentication information in the same way as in FIG. 25, 9B on the display device 120. The operation input acceptance unit 12 of each of the communication terminals (10b, 10c), in response to operation by the user on the acceptance screen, accepts an input of PIN codes as participation authentication information (step S30). The input participation authentication information is information that only a user having a privilege of participating in the session can know, and is, for example, information provided to the respective users of the transmission terminals (10a, 10b, 10c) by means of a previous video conference, a telephone, an e-mail or the like. The transmission/reception unit 11 of each of the communication terminals (10b, 10c) sends the accepted participation authentication information to the management system 50 (step S31).

When the transmission/reception unit 51 of the management system 50 receives the participation authentication information, the authentication unit 52 performs authentication for participation in a session (step S32). In this case, the session control unit 58 of the management system 50 compares the participation authentication information received from the communication terminal (10b or 10c), with the participation authentication information managed in the terminal management table in association with the communication ID of the communication terminal 10a that is the start request source, and determines whether both pieces of information coincide with each other. Here, if both pieces of information coincide with each other, the authentication is successful. If both pieces of information do not coincide with each other, the authentication is not successful. In the following, the explanation continues assuming that the authentication unit 52 succeeds in the authentication.

The session control unit 58 of the management system 50 performs control for establishing a session "sed" for sending image data, sound data and image information via the communication network 2 among the communication terminals (10a, 10b, 10c) (step S33). The method for establishing the session "sed" is not particularly limited. However, when a relay apparatus for relaying the image data, sound data and the image information is arranged on the communication network 2, the method for establishing the session "sed" includes a method of sending connection information for connecting to the relay apparatus to the communication terminals (10a, 10b, 10c) from the transmission/reception unit 51. Moreover, the session control unit 58 may cause the transmission/reception unit 51 to require the relay apparatus to relay the image data, the sound data and the image information among the communication terminals (10a, 10b, 10c).

Based on the above-described control, the session "sed" is established. Therefore, the communication terminals (10a, 10b, 10c) become capable of sending/receiving image data, sound data and image information to/from the communication terminals (10c, 10b, 10a) that are communication partners (step S34).

Subsequently, with reference to FIG. 10, a process of sending image information among the communication terminals 10 will be described. FIG. 10 is a sequence diagram depicting a process of sending image information among the communication terminals 10.

When the user brings a nib or another end of the input device 300 into contact with the touch panel 224 of the IWB 20a, the input device sends a contact detection signal. When the signal reception device 225 receives the contact detection signal, the touch panel 224 detects that coordinates of a contact position move and outputs image information indicating a stroke. When the image information is input to the communication terminal 10a via the external device connection I/F 118, the operation input acceptance unit 12 accepts an operation input of the stroke (step S61).

Next, the display control unit 13 outputs the image information input via the external device connection I/F 118 to the display device 220 (step S62). Therefore, on the display device 220, the stroke based on the image information is displayed overlaying images output by the previous process. The above-described stroke may be displayed based on control on the side of the IWB 20*a*.

The transmission/reception unit 11 of the communication terminal 10*a* sends the above-described image information, a sheet number of the sheet on which an image is drawn or the like, time when the image information is created, the communication ID of the own terminal (communication terminal 10*a*), and the session ID of the session "sed" among the communication terminals (10*a*, 10*b*, 10*c*) to the communication terminals (10*b*, 10*c*) that are communication partners in the session "sed" (step S63-1, S63-2). Furthermore, the transmission/reception unit 11 sends the image information, the sheet number of the sheet on which an image is drawn or the like, the time when the image information is created, the communication ID of the own terminal (communication terminal 10*a*), and the session ID of the session "sed" among the communication terminals (10*a*, 10*b*, 10*c*), which are the same as those sent to the communication terminals (10*b*, 10*c*), to the management system 50 (step S64).

When the transmission/reception unit 11 of each of the communication terminals (10*b*, 10*c*) receives the image information sent from the communication terminal 10*a*, each display control unit 13 outputs the image information to the display device 220 via the external device connection I/F 118 (step S65-1, S65-2). Therefore, on the display device 220, a stroke based on the image information is displayed overlaying images output by the previous process.

On the other hand, in the management system 50, when the session "sed" is established among the communication terminals (10*a*, 10*b*, 10*c*), the storage/readout unit 59 generates an image information management table related to the session "sed" (see FIG. 7B), and registers the table in the image information management DB 5004 (step S60). At this time, the storage/readout unit 59 registers a session ID of the established session into a field of session ID in the image information management table. Furthermore, the storage/readout unit 59 registers a PIN code, which is participation authentication information sent from the communication terminal 10*a* that is the start request source in step S24, into a field of participation authentication information in the image information management table.

When the transmission/reception unit 51 of the management system 50 receives the respective pieces of information sent from the communication terminal 10*a* (step S64), the storage/readout unit 59 registers the image information into an image information management table, to which the same session ID as that sent from the communication terminal 10*a* is registered (step S66). In this case, the image information, the communication ID and the time sent from the communication terminal 10*a* are additionally stored in association with each other into a section of the sheet number sent from the communication terminal 10*a*. Therefore, in the management system 50, a log of the respective pieces of image information sent by the communication terminal 10*a* can be managed.

When the communication terminal 10*b* sends image information, in the above-described steps S61 to S66, because the communication terminals (10*a*, 10*b*, 10*c*) are merely changed to communication terminals (10*b*, 10*c*, 10*a*), detailed description will not be provided. Moreover, when the communication terminal 10*c* sends image information, in the above-described steps S61 to S66, because the communication terminals (10*a*, 10*b*, 10*c*) are merely changed to communication terminals (10*c*, 10*a*, 10*b*), detailed description will not be provided.

Next, with reference to FIG. 11, a process of reproducing an image shared among the communication terminals (10*a*, 10*b*, 10*c*) after the communication terminal 10*a* leaves the session "sed" will be described. FIG. 11 is a sequence diagram depicting a process of reproducing an image. In the following, the process of reproducing an image in the communication terminal 10*a* will be described, but a device reproducing an image is not limited to the communication terminal 10*a*. For example, at other communication terminals (10*b*, 10*c*), personal computers (PCs) of users of the other communication terminals (10*a*, 10*b*, 10*c*) or the like, the image can 25, be reproduced. When the image is reproduced at the PC, the PC enables a function of the transmission/reception unit 11, the display control unit 13 or the like at the communication terminal 10 by an operation by application software and hardware cooperating with each other. In this case, the communication terminal 10 in the following description can be replaced by the other communication terminal 10 or the other device.

The management system 50 according to the embodiment is provided with a Web server function. The communication terminal 10*a* can reproduce an image by using an image reproduction service provided by the Web server function of the management system 50. At first, the transmission/reception unit 11 of the communication terminal 10*a* accesses the image reproduction service of the management system 50, in response to an operation input by a user (step S201). In response to the access, the transmission/reception unit 51 of the management system 50 sends an HTML file of a login screen for the image reproduction service to the communication terminal 10*a* (step S202). The login screen is output on an arbitrary display device (120, 220) by the display control unit 13. FIG. 12A is a diagram depicting an example of the login screen.

The transmission/reception unit 21 of the communication terminal 10*a*, sends the communication ID of the own terminal and a password that are input to the management system 50, in response to an operation by the user on the login screen (step S203). The authentication unit 52 of the management system 50 determines whether the same pair of communication ID and password as that sent from the communication terminal 10*a* is managed in an arbitrary storage region in the storage unit 5000, and thereby authenticates the login request source (step S204).

When it is determined to be a valid terminal according to the authentication, the creation unit 54 searches the image information management DB 5004 with the communication ID of the communication terminal 10*a* that is the login request source as a search key, and extracts an image information management table including the communication ID (See FIG. 7B). Furthermore, the creation unit 54 specifies participation date, participation time, number of locations (number of participating terminals) or the like in each session that the communication terminal 10*a* participates in based on information recorded in each of the extracted image information management tables. Then, the creation unit 54 creates an HTML file of a conference history screen indicating a button for accepting a request for reproducing an image generated in each specified date of participation, each time of participation, each number of locations and each session (step S205). Each button corresponds to the session ID. The transmission/reception unit 51 of the management system 50 sends the HTML file of the conference history screen to the communication terminal 10*a* (step S206).

At the communication terminal 10*a* that receives the HTML file of the conference history screen, the display control unit 13 outputs the conference history screen to an arbitrary display device (120, 220). FIG. 12B is a diagram depicting an example of the conference history screen. When a selection of whiteboard information reference button of any session is accepted by the operation input acceptance unit 12 of the communication terminal 10a, the transmission/reception unit 11 sends a request for reproducing an image generated in the selected session to the management system 50 (step S207). The image reproduction request includes the session ID corresponding to the selected button.

When the image reproduction request is received by the transmission/reception unit 51 of the management system 50, the storage/readout unit 59 reads out an image information management table, in which the session ID included in the image reproduction request is registered, from the image information management DB 5004. When participation authentication information is registered in the readout image information management table, the transmission/reception unit 51 requires participation authentication information of the communication terminal 10a (step S208).

At the communication terminal 10a that receives the request for participation authentication information, the display control unit 23 outputs an input form for the participation authentication information overlaying the conference history screen. FIG. 12C is a diagram depicting an example of display of the display device. The operation input acceptance unit 12 of the communication terminal 10a accepts an input for participation authentication information in response to an operation by the user on the input form (step S209). The participation authentication information that is input is set for each session, and sent to the management system 50 from the communication terminal 10 in step S24. The transmission/reception unit 11 of the communication terminal 10a sends the input participation authentication information and a session ID of a session related to an image generation request to the management system 50 (step S210).

When the transmission/reception unit 51 of the management system 50 receives the participation authentication information and the session ID, the authentication unit 52 performs authentication of the image reproduction request (step S211). In this case, the authentication unit 52 determines whether a pair of participation authentication information registered in the image information management table and a session ID coincides with the pair of the participation authentication information and the session ID sent from the communication terminal 10a. If they coincide with each other, the authentication is successful, and if they do not coincide with each other, the authentication is not successful. When the authentication is not successful, the transmission/reception unit 51 sends an error message to the communication terminal 10a and the process ends.

If the authentication is successful, the creation unit 54 reads out image information, a communication ID and time related to each image for every sheet number from the image information management table, in which the pair of participation authentication information and the session ID that is the same as that sent from the communication terminal 10a is registered (See FIG. 7B) (step S212). Moreover, the creation unit 54 creates an HTML file of whiteboard sharing screen.

Next, the transmission/reception unit 51 of the management system 50 sends the HTML file of whiteboard sharing screen to the communication terminal 10a. Moreover, the transmission/reception unit 51 sends the image information, the communication ID and the time, in association with each other, related to each image read out for every sheet number from the image information management table in step S208 to the IWB 20a (step S213).

Figure 13:
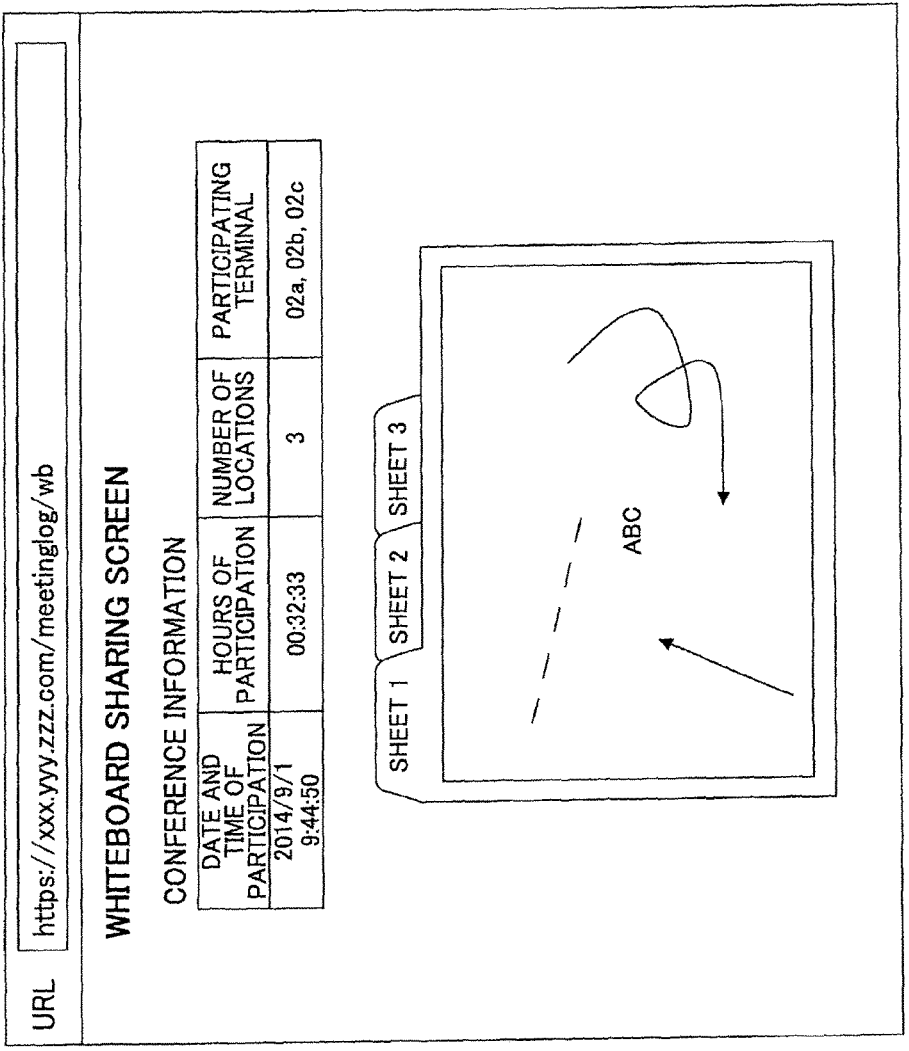
FIG. 13 is a diagram depicting another display example of the display device according to the embodiment.

When the transmission/reception unit 11 of the communication terminal 10a receives the HTML file of the whiteboard sharing screen and information read out from the image information management table, the display control unit 13 outputs the whiteboard sharing screen to an arbitrary display device (120, 25, 220) (step S214). Subsequently, the display control unit 13 outputs an image, which reflects all pieces of image information related to the default sheet number (e.g. sheet number 1) of the pieces of image information sent from the management system 50, overlaying the whiteboard sharing screen. Therefore, in the whiteboard sharing screen, the image of the default sheet is displayed. FIG. 13 is a diagram depicting an example of display on the display device.

Variation of the Embodiment

Figure 14:
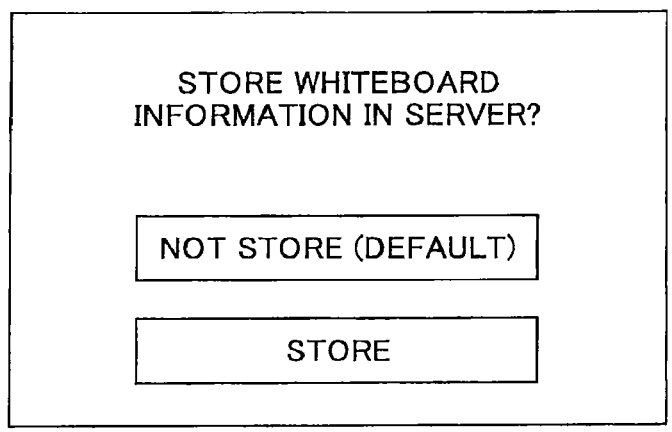
FIG. 14 is a diagram depicting yet another display example of the display device according to the embodiment.

According to the communication system 1 of the embodiment, it is possible to switch whether the whiteboard sharing screen is left. In this case, the display control unit 13 of the communication terminal 10 outputs, at an arbitrary timing, a screen for accepting an input of whether the whiteboard sharing screen is left to an arbitrary display device (120, 220). FIG. 14 is a diagram depicting an example of display on the display device.

The transmission/reception unit 11 of the communication terminal 10 sends, at an arbitrary timing, information indicating whether the whiteboard sharing screen is left accepted by the operation input acceptance unit 12 to the management system 50. When it is selected that the whiteboard sharing screen is not left, even if image information is sent from the communication terminal 10 to the management system 50, the storage/readout unit 59 of the management system 50 does not store the image information in the storage unit 5000. Alternatively, the storage/readout unit 59 of the management system 50 may store the image information in the storage unit 5000, but the image information stored in the storage unit 5000 is deleted when the communication terminal 10 leaves the session.

Main Effect of the Embodiment

Next, a main effect of the embodiment will be described. In the above-described data management method, the terminal management DB 5002 or the image information management DB 5004 (an example of an authentication information management means) of the management system 50 manages participation authentication information (an example of authentication information) used for authenticating participation in a session by the communication terminal 10. The image information management DB 5004 (an example of a content data management means) of the management system 50 manages image information (an example of content data) sent among the communication terminals 10 in the session. The transmission/reception unit 51 (an example of a request acceptance means) of the management system 50 accepts a request for image information managed in the image information management DB 5004 (an example of a request acceptance process). The authentication unit 52 (an example of an authentication means) of the management system 50 authenticates a request source of image information using the participation authentication information managed in the image information management DB 5004 (an example of an authentication process). When authentication by the authentication unit 52 is successful, the transmission/reception unit 51 (an example of a transmission means) of the management system 50 sends the image information managed in the image information management DB 5004 to the communication terminal 10 that is a request source of the image information (an example of a transmission process). Accordingly, when the communication terminal 10 accesses the image information management DB 5004, by authenticating using the participation authentication information to the session, it is possible to prevent the image information from being sent to a request source of image information that does not participate in the session.

The authentication unit 52 performs authentication based on whether the participation authentication information sent by the communication terminal 10 that is a request source of image information coincides with participation authentication information managed in the image information management DB 5004. Accordingly, it is possible to authenticate requests by a plurality of communication terminals 10 using participation authentication information which is shared in each session.

The image information management DB 5004 manages participation authentication information and one or more pieces of image information sent among the communication terminals 10 in the session, in association with each other. The transmission/reception unit 51 sends one or more pieces of image information, which are managed in association with the participation authentication information sent by the communication terminal 10 that is the request source of the image information, to the communication terminal 10 that is the request source of the image information. Accordingly, it is possible to send one or more pieces of image information sent during the session being established to the communication terminal 10 that is the request source.

The transmission/reception unit 51 of the management system 50 can accept a request of image information from a communication terminal 10 different from the communication terminal 10 participating in the session among the communication terminals 10. Accordingly, convenience for the user is improved.

When the communication terminal 10 requests to participate in the session among the communication terminals 10 and requests image information managed in the management system 50, the communication terminal 10 sends participation authentication information set for each session to the management system 50. By sending the participation authentication information, which is common upon requesting to participate in the session and upon requesting image information, to the management system 50, it is possible to perform authentication by using common authentication information in the management system 50.

Supplement to the Embodiment

Respective programs for the communication terminal 10, the IWB 20 and the management system 50 may be stored in a recording medium (recording medium 106 or the like) readable by a computer as a file of an installable format or an executable format and distributed. Moreover, another example of the above-described recording medium includes CD-R (Compact Disc Recordable), DVD (Digital Versatile Disk), Blu-ray Disc (trademark registered) or the like. Moreover, the above-described recording medium or the HD 504 storing these programs can be provided in the country and abroad as a program product.

Moreover, the communication terminal 10, the IWB 20 and the management system 50 in the embodiment may be a single apparatus or may be a plurality of apparatuses to which the respective parts (functions or means) are divided and arbitrarily allocated.

In the above description, the IWB 20 is described as an example of an image sharing device. However, the present invention is not limited to this. For example, the IWB 20 may be replaced by an electronic blackboard, a personal computer (PC) provided with image sharing function or the like.

Furthermore, in the above description, the video conference is explained to be performed by using the image sharing device (generic concept) such as the IWB 20 (specific concept). However, the present invention is not limited to this. The present invention includes an application of the embodiment in a field of communication as a wider concept including the video conference. For example, the embodiment can be applied when sending image information related to an image output at a plurality of communication terminals among the communication terminals in a projector system, a digital signage device, a text sharing system, a car navigation system, a communication system of gaming machines or the like.

Further, the present invention is not limited to these embodiments, but various variations and modifications may be made without departing from the scope of the present invention.

What is claimed is:
1. A management server comprising:
processing circuitry configured to
    manage authentication information used in authentication of a request to participate in a session among communication terminals, the authentication information including a code set by a user of a communication terminal in association with a session identification (ID),
    manage content data transmitted among the communication terminals in the session, the content data being associated with a communication ID of a communication terminal that is a transmission source of the content data,
    accept a request for the content data managed,
    perform authentication using the authentication information managed, and
    transmit the content data managed to a communication terminal that is a request source of the content data, when authentication of the request for the content data using the authentication information is successful, wherein
the processing circuitry is further configured to
    manage the content data in association with the session ID and the code included in the authentication information, and
    determine whether a session ID and a code input by a user of the communication terminal that is the request source of content data coincide with the code included in the authentication information and set in association with the session ID, and perform the authentication, and
the content data transmitted corresponds to content data associated with the session ID and the code included in the authentication information.
2. A communication system comprising:
the management server according to claim 1; and a communication terminal configured to transmit the content data to another communication terminal in the session.

3. The communication system according to claim 2, wherein the communication terminal is configured to transmit authentication information that is set for each session to the management server, when the request to participate in the session among the communication terminals is performed or when the content data managed in the management server are requested.

4. The management server according to claim 1, wherein the content data includes one of stroke data, textual data, coordinate information indicating a position where an image is output or deleted, size data, color data, and font data.

5. A data management method for managing data in a management server that includes processing circuitry configured to manage authentication information used in authentication of a request to participate in a session among communication terminals, the authentication information including a code set by a user of a communication terminal in association with a session identification (ID), and manage content data transmitted among the communication terminals in the session, the content data being associated with a communication ID of a communication terminal that is a transmission source of the content data, and the content data being managed in association with the session ID and the code included in the authentication information, the method comprising:
   accepting a request for the content data managed;
   determining whether a session ID and a code input by a user of a communication terminal that is a request source of content data coincide with the code included in the authentication information and set in association with the session ID;
   performing, in view of the determining, authentication using the authentication information; and
   transmitting the content data, which is associated with the session ID and the code included in the authentication information, to the communication terminal that is the request source of the content data, when authentication of the request for the content data using the authentication information is successful.

6. The data management method according to claim 5, further comprising:
   transmitting, from the communication terminal, authentication information that is set for each session to the management server, when the request to participate in the session among the communication terminals is performed or when the content data managed in the management server are requested.

7. A non-transitory computer-readable recording medium storing a program, which when executed by processors, causes a communication terminal that is configured to transmit content data to another communication terminal to execute the data management method according to claim 6.

8. A non-transitory computer-readable recording medium storing a program, which when executed by a computer, causes the computer to perform the data management method according to claim 5.

* * * * *